US010800381B2

(12) United States Patent
Schwegler et al.

(10) Patent No.: US 10,800,381 B2
(45) Date of Patent: Oct. 13, 2020

(54) VEHICLE ACCESS SYSTEM BATTERY AND SECURITY MANAGEMENT VIA INTERFACE DIVERSITY

(71) Applicant: Continental Automotive Systems Inc., Auburn Hills, MI (US)

(72) Inventors: Jason Brian Schwegler, Grand Blanc, MI (US); Michael Eric Pierfelice, Royal Oak, MI (US); Brian James Marlett, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/385,078

(22) Filed: Apr. 16, 2019

(65) Prior Publication Data
US 2020/0198576 A1    Jun. 25, 2020

Related U.S. Application Data

(60) Provisional application No. 62/782,446, filed on Dec. 20, 2018.

(51) Int. Cl.
*B60R 25/24*    (2013.01)
*B60R 25/40*    (2013.01)

(52) U.S. Cl.
CPC ............ *B60R 25/24* (2013.01); *B60R 25/403* (2013.01); *B60R 2325/101* (2013.01)

(58) Field of Classification Search
CPC ... B60R 25/24; B60R 25/403; G07C 9/00309; G07C 2209/00793; E05B 47/0001; E05B 39/005
USPC ........................................................ 340/12.22
See application file for complete search history.

(56) References Cited

U.S. PATENT DOCUMENTS

| 9,894,492 | B1* | 2/2018 | Elangovan | ............ H01Q 1/3241 |
| 10,043,326 | B2* | 8/2018 | DeCia | ................ G07C 9/00309 |
| 2006/0255908 | A1* | 11/2006 | Gilbert | .................... B60R 25/24 |
| | | | | 340/5.61 |
| 2018/0114386 | A1* | 4/2018 | Steinmetz | .......... G07C 9/00571 |

* cited by examiner

Primary Examiner — Vernal U Brown

(57) ABSTRACT

A method for access to a vehicle includes determining first environment patterns for a plurality of interfaces relative to a vehicle, determining whether the first environment patterns match second environment patterns for the plurality of interfaces relative to an identification device, and allowing access to the vehicle if a match is determined.

20 Claims, 8 Drawing Sheets

VEHICLE ACCESS SYSTEM BATTERY AND SECURITY MANAGEMENT VIA INTERFACE DIVERSITY

CROSS-REFERENCE TO RELATED APPLICATIONS

This application claims priority to U.S. Provisional Application No. 62/782,446, filed Dec. 20, 2018.

BACKGROUND

This disclosure is directed generally to vehicle access systems, and more particularly to vehicle access system battery and security management via interface diversity.

Vehicles are known to include locking systems for allowing or denying access. Vehicles communicate with identification devices through a variety of communication interfaces.

SUMMARY

A method for access to a vehicle according to an example of this disclosure, includes determining first environment patterns for a plurality of interfaces relative to a vehicle, determining whether the first environment patterns match second environment patterns for the plurality of interfaces relative to an identification device, and allowing access to the vehicle if a match is determined.

In a further example of the foregoing, the method includes receives the second environment patterns from the identification device to the vehicle.

In a further example of any of the foregoing, the method includes unlocking a door of the vehicle.

In a further example of any of the foregoing, the plurality of interfaces include LTE.

In a further example of any of the foregoing, the plurality of interfaces include Wi-Fi.

In a further example of any of the foregoing, the plurality of interfaces include BLE.

In a further example of any of the foregoing, an ECU system of the vehicle performs one or more of the method steps.

In a further example of any of the foregoing, the ECU system includes a plurality of electronic control units.

A vehicle access system according to an example of this disclosure includes a lock. An ECU system is configured to determine a first group of environmental patterns for a plurality of interfaces for the vehicle, receive a second group of environmental patterns for the plurality of interfaces for an identification device, compare the first group to the second group, and send a control signal to the lock based on the comparison.

In a further example of the foregoing, the control signal is a signal to disengage the lock.

In a further example of any of the foregoing, the ECU system includes a plurality of electronic control units.

In a further example of any of the foregoing, the ECU system includes an access rights management electronic control unit.

In a further example of any of the foregoing, the ECU system is configured to power down a device associated with one or more of the plurality of interfaces based on the comparison.

In a further example of any of the foregoing, the ECU system is configured to alter a search and listen pattern based on the comparison.

In a further example of any of the foregoing, the ECU system is configured to communicate with the identification device.

A method of conserving power in a vehicle according to an example of this disclosure includes determining first environment patterns for a plurality of interfaces relative to a vehicle, comparing the first environment patterns to second environment patterns for the plurality of interfaces relative to an identification device, and powering down a device of the vehicle based on the comparing step.

In a further example of the foregoing, the method includes altering a search and listen pattern based on the comparing step.

In a further example of any of the foregoing, the powering down is performed in response to a mismatch between the first environment patterns and the second environment patterns.

In a further example of any of the foregoing, the mismatch is between a BLE pattern of the first environment patterns and a BLE pattern of the second environment patterns, and the powered down device is a BLE transceiver.

In a further example of any of the foregoing, the mismatch is between a Wi-Fi pattern of the first environment patterns and a Wi-Fi pattern of the second environment patterns, and the powered down device is a Wi-Fi transceiver.

These and other features may be best understood from the following specification and drawings, the following of which is a brief description.

DETAILED DESCRIPTION

Figure 1:
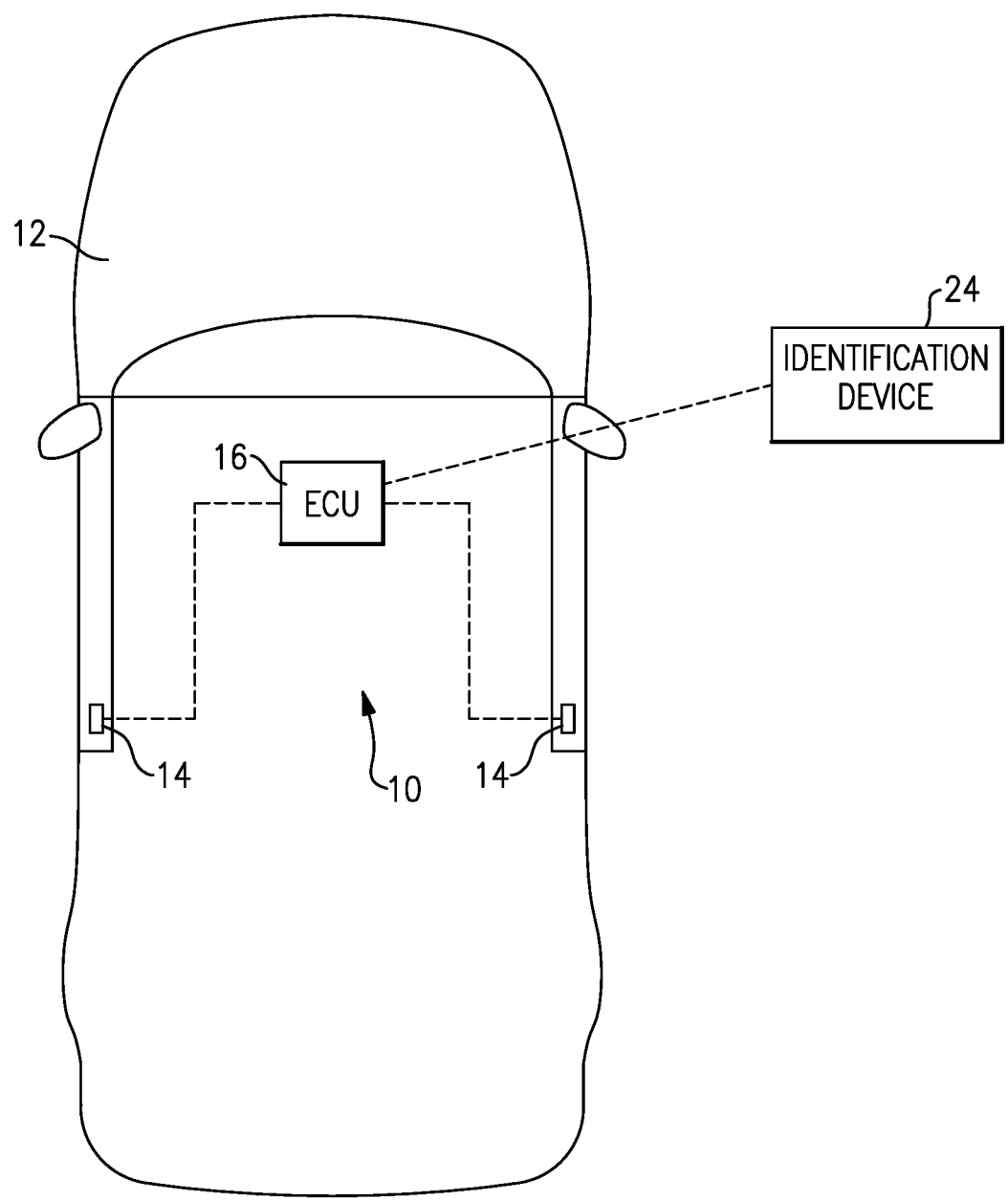
FIG. 1 schematically illustrates a vehicle access system of a vehicle.

FIG. 1 schematically illustrates a vehicle access system 10 in a vehicle 12. The vehicle 12 includes one or more locks 14, such as door locks in the example shown, operable to engage or disengage to deny or allow access to the vehicle 12. The locks 14 are controllable by control signals from an engine control unit (ECU) system 16. The ECU system 16 may include one or more individual electronic control units that control one or more electronic systems or subsystems within the vehicle 12. In some examples, the ECU system 16 includes a vehicle access rights management electronic control unit. Although two locks 14 are shown in the illustrative example, more or fewer locks 14 may be utilized.

The ECU system 16 may include one or more processors that executes, and memory that stores, computer-executable instructions for performing the various methods, functions, protocols, procedures, etc., described herein. The memory may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), other variants, combinations thereof, and/or any other type(s) of memory suitable for providing the described functionality and/or storing computer-executable instructions for execution by the processor.

The ECU system 16 communicates with an identification device 24 to allow or deny access to the vehicle 12, as explained further below. Some example identification devices 24 may include smartphones or other handheld devices.

Figure 2:
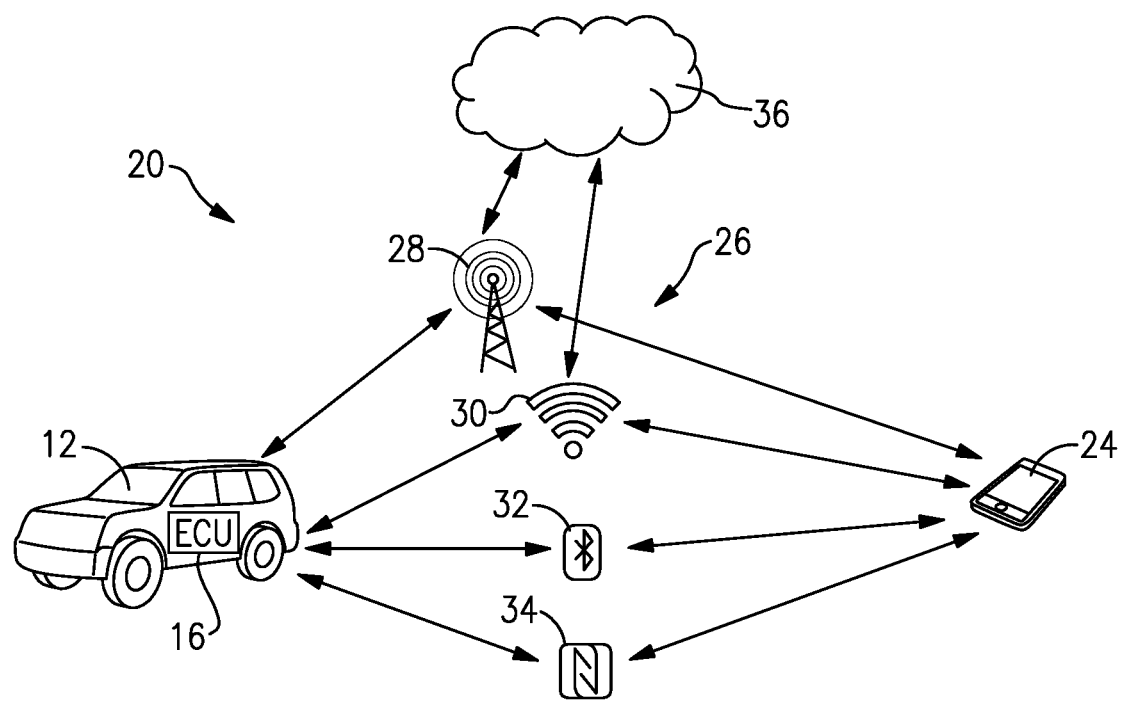
FIG. 2 schematically illustrates communication between the vehicle of FIG. 1 and an identification device.

FIG. 2 schematically illustrates the communication between the ECU system 16 of the vehicle 12 and an identification device 24. The example identification device 24 may be in communication with the ECU system 16 through multiple interfaces 26, including LTE 28, Wi-Fi 30, Bluetooth Low Energy (BLE) 32, and Near-field communication 34. More or fewer interfaces 26, including Qi and GPS, may be used in some examples. In some examples, the vehicle 12 may include an individual transceiver for each interface. As shown, the LTE 28 and Wi-Fi 30 communications may be through the cloud 36. In other examples, one or both of the LTE 28 and Wi-Fi 30 communications may be peer-to-peer.

As discussed further below, the system 10 may use available side channels, such as additional interfaces to a primary interface or additional transceivers of a same interface, to enhance the signature of a security handshake, as well as to provide context for the identification device 24 and vehicle 12 to optimize the number of interfaces 26 in use and their polling strategy to conserve energy.

Interface 26 selection may vary for each environment that the vehicle 12 and the identification device 24 find themselves in at any given time or distance separation. Distance separation may occur when the distance between the vehicle 12 and identification device 24 increases, such as when a user leaves the vehicle 12 in some examples. Each interface 26 may have a different range of area and performance that allow it to cover a different area.

Figure 3:
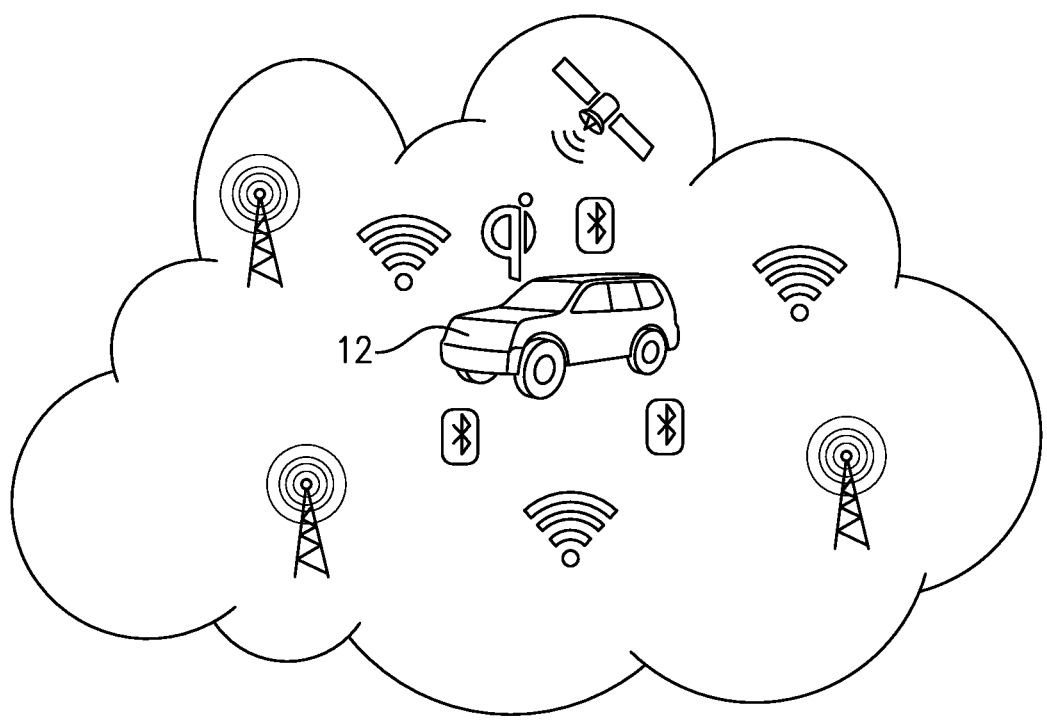
FIG. 3 schematically illustrates example wireless communication interfaces.
Figure 3:
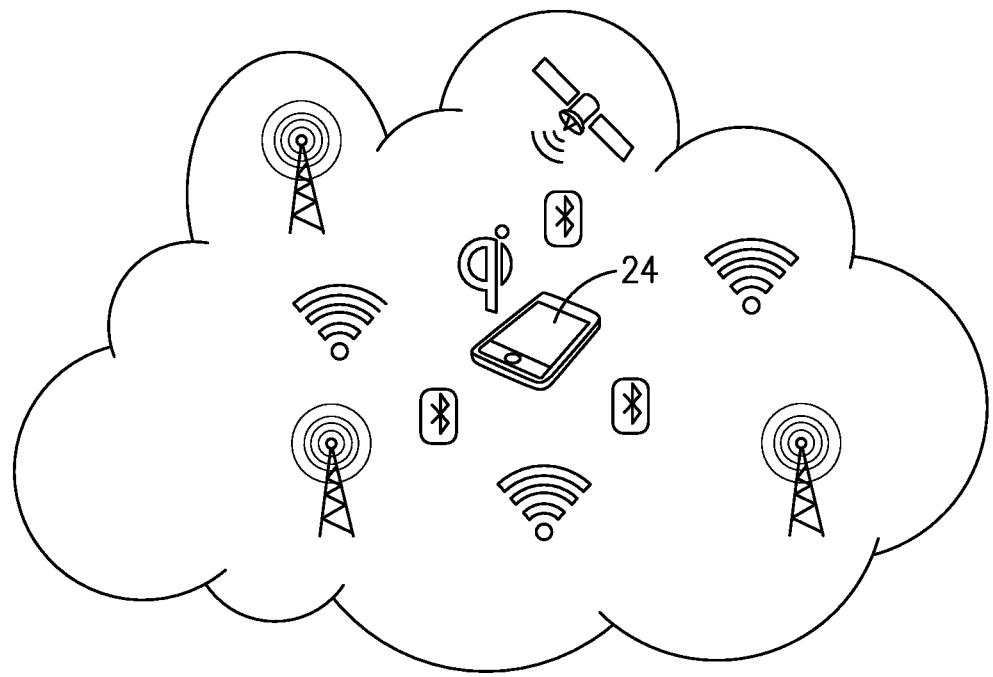

As illustrated in FIG. 3, there could be any combination of wireless interface measurements or environment detection sensors available to the vehicle 12 and the identification device 24. In some examples, the ECU system 16 analyzes this data to determine whether the vehicle 12 and identification device 24 are in close proximity to one another, which can be used to allow or deny access to the vehicle 12, and/or to power up or power down certain devices or functions of the vehicle 12 for power conservation.

Figure 4:
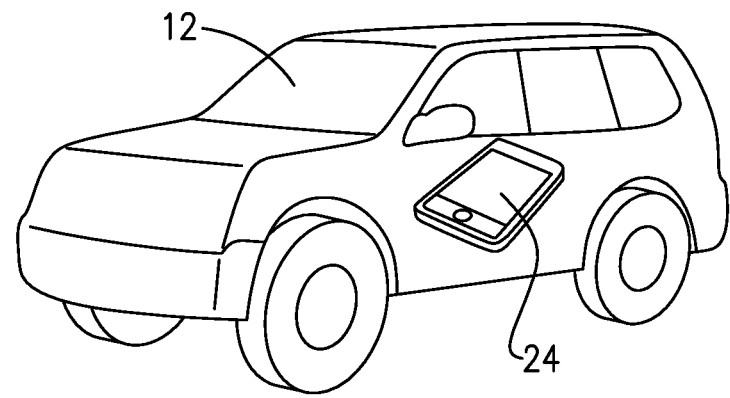
FIG. 4 schematically illustrates example environmental patterns for wireless interfaces.
Figure 4:
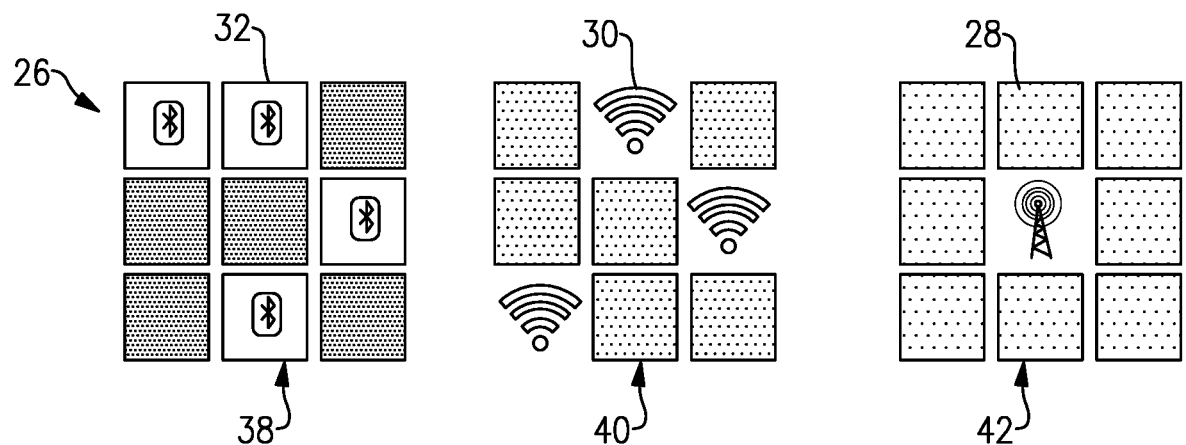

As illustrated in FIG. 4, a number of interfaces 26 may be selected for communication between the vehicle 12 and identification device 24. In the illustrative example, LTE 28, Wi-Fi 30, and BLE 32 are selected as interfaces 26. More or fewer interfaces 26 may be selected in some examples. Additional or alternative interfaces 25 may be selected in some examples. Environmental patterns 38, 40, 42 may be provided for each interface 26 at each of the vehicle 12 and identification device 24. The environmental patterns 38, 40, 42 may be indicative of density maps of where various transmitters, receivers, transceivers, etc., such as BLE transmitters, Wi-Fi transmitters, and cell towers in the illustrative example, are located relative to the respective vehicle 12 or device 24.

As one example, if the same patterns 38, 40, 42 are shown for the vehicle 12 and identification device 24 across all interfaces 26, then the vehicle 12 and identification device 24 are in close proximity. In some examples, if patterns 38, 40, 42 match across all selected interfaces 26, the user with the known and/or authenticated identification device 24 is in close proximity to the vehicle 12, and access to the vehicle 12 is allowed. If patterns 38, 40, 42 mismatch across one or more of the selected interfaces 26, then access to the vehicle 12 is denied. Pattern alignment or mismatch of the common interface environments is therefore a controlling factor for the vehicle access system 10.

Figure 5:
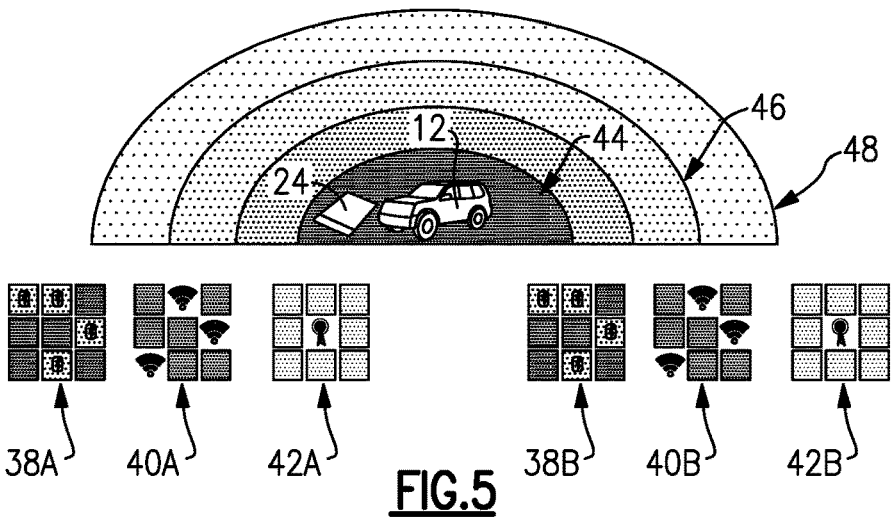
FIG. 5 schematically illustrates the vehicle and the identification device within the same zones for three example interfaces.

As illustrated in FIG. 5, the interfaces 26 may have varying ranges, such that a zone 44 is provided in which BLE patterns for vehicles and devices within the zone 44 are the same, a larger zone 46 is provided in which Wi-Fi patterns are the same, and a larger zone 48 is provided in which the LTE patterns are the same. In the example, the vehicle 12 and identification device 24 are within a zone 44, and the patterns 38A, 40A, 42A for the vehicle 12 match the patterns 38B, 40B, 42B for the identification device 24. That is, the vehicle 12 and the identification device 24 are in the same BLE, Wi-Fi, and LTE environment. In some examples, access to the vehicle 12 may be allowed in this condition. With reference to FIG. 1, the ECU 16 may compare the patterns 38A, 40A, 42A for the vehicle 12 and the patterns 38B, 40B, 42B for the identification device 24, determine a match, and allow access to the vehicle 12, such as by unlocking the locks 14. In some examples, devices, such as transceivers in some examples, associated with the interfaces 26 may be left on at the vehicle 12 side in this state.

In some examples, in response to the patterns shown in FIG. 5, minor adjustments are made to access availability with direct communication still available. For example, when the identification device 24 is within range of the vehicle 12 for all interfaces 26, the vehicle 12 may make one or more adjustments based on the signal strength of the BLE 32. In an example, as the signal strength lessens, the polling rate of a search and listen function of the ECU system 16 is decreased to conserve power, as this indicates that the user with the identification device 24 is moving farther away from the vehicle 12. Conversely, in some examples, if the signal strength increases, the polling rate of the search and listen function may increase. As one example, the vehicle 12 may have a 100 m range with the identification device 24 through BLE 32. If the user is within 5 m, the system 10 may need to react to a user accessing the vehicle within 3-5 seconds. If the user is 50 m, the system 10 may only need to react to access requests within 30-40 seconds. In some examples, devices, such as transceivers, of the vehicle 12 may be powered up or down in response to range changes.

Figure 6:
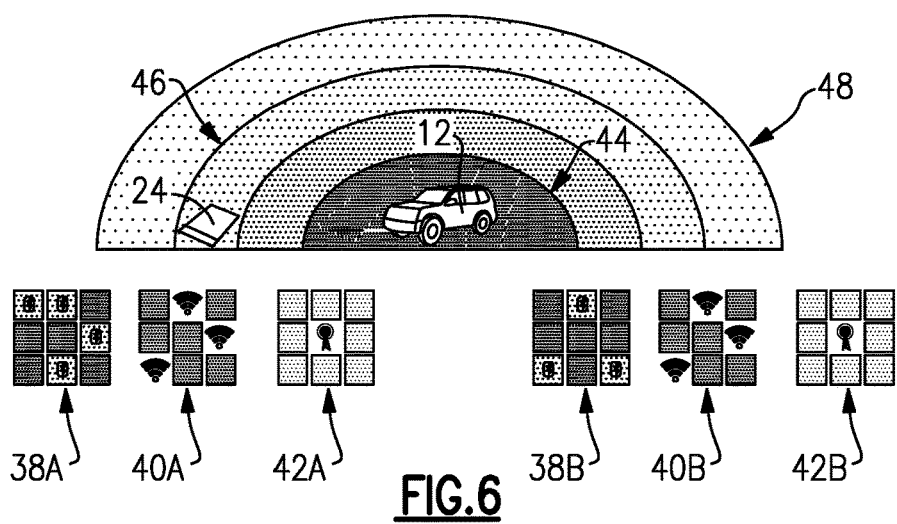
FIG. 6 schematically illustrates the vehicle and the identification device within the same zones for two example interfaces, but in a different zone for one example interface.

As illustrated in FIG. 6, the vehicle 12 and identification device 24 are within zone 46, but the identification device 24 is outside of zone 44, such that the patterns 38A and 38B are mismatched. That is, the vehicle 12 and identification device 24 are in different BLE environments, but the same Wi-Fi and LTE environment. In this state, in some examples, access to the vehicle 12 may be denied. In some examples, with reference to FIG. 1, the ECU 16 may determine a mismatch between the patterns 38A and 38B and deny access to the vehicle 12, such as by locking the locks 14 and/or allowing the locks 14 to remain locked. In some examples, one or more BLE associated devices, such as a BLE transceiver in some examples, may be turned off on the vehicle 12 side in order to conserve vehicle power because the identification device 24 is out of BLE range.

In some examples, in response to the patterns shown in FIG. 6, increased adjustments to access availability are made with direct or indirect communication. For example, with a BLE 32 mismatch, there could still be direct communication through Wi-Fi 30 between the identification device 24 and the vehicle 12. In some examples, the Wi-Fi 30 communication could be routed to the cloud. In some examples, the vehicle 12 and the identification device 24 may communicate to signal to the system 10 that the identification device 24 is approaching, even when the identification device 24 is out of range.

Figure 7:
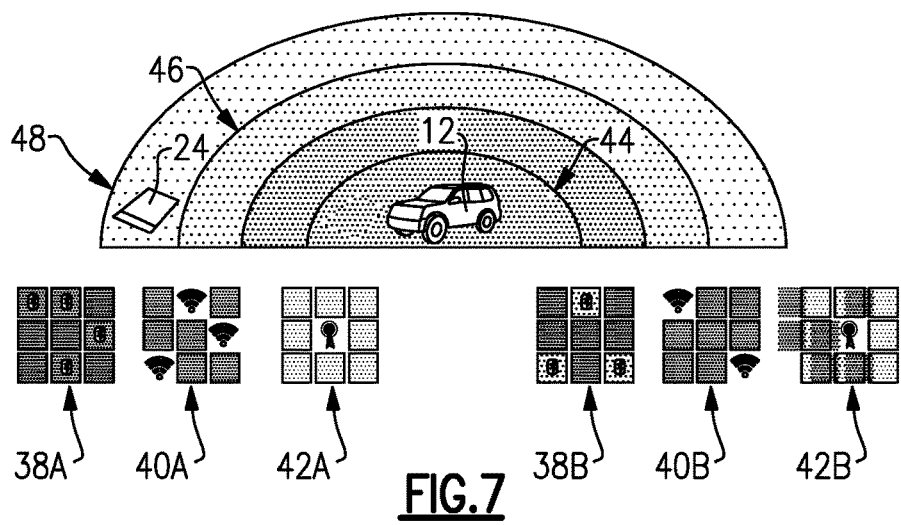
FIG. 7 schematically illustrates the vehicle and the identification device within the same zones for an example interface, but in a different zone for two example interfaces.

As illustrated in FIG. 7, the vehicle 12 and identification device 24 are within the zone 48, but the identification device 24 is outside of the zones 44 and 46, such that patterns 38A and 38B are mismatched, and patterns 40A and 40B are mismatched. That is, the vehicle 12 and the identification device 24 are in different BLE and Wi-Fi environments, but the same LTE environment. In this state, in some examples, access to the vehicle 12 may be denied. In some examples, with reference to FIG. 1, the ECU 16 may determine a mismatch between the patterns 38A and 38B, as well as the patterns 40A and 40B, and deny access to the vehicle 12. In some examples, one or more BLE and Wi-Fi associated devices, such as BLE and Wi-Fi transceivers in some examples, may be turned off on the vehicle 12 side in order to conserve vehicle power because the identification device 24 is out of BLE and Wi-Fi range.

In some examples, in response to the patterns shown in FIG. 7, significant adjustments to access availability are made with indirect communication required. In some examples, with the BLE 32 and WiFi 30 patterns 38A and 38B and patterns 40A and 40B being mismatched, communication between the identification device 24 and the vehicle 12 may only occur via indirect cloud communication. The access rights of that specific device may then be blocked for a period of time to prevent a relay attack opportunity, in which an intermediary device is used to relay signals from the identification device 24 to the vehicle.

Figure 8:
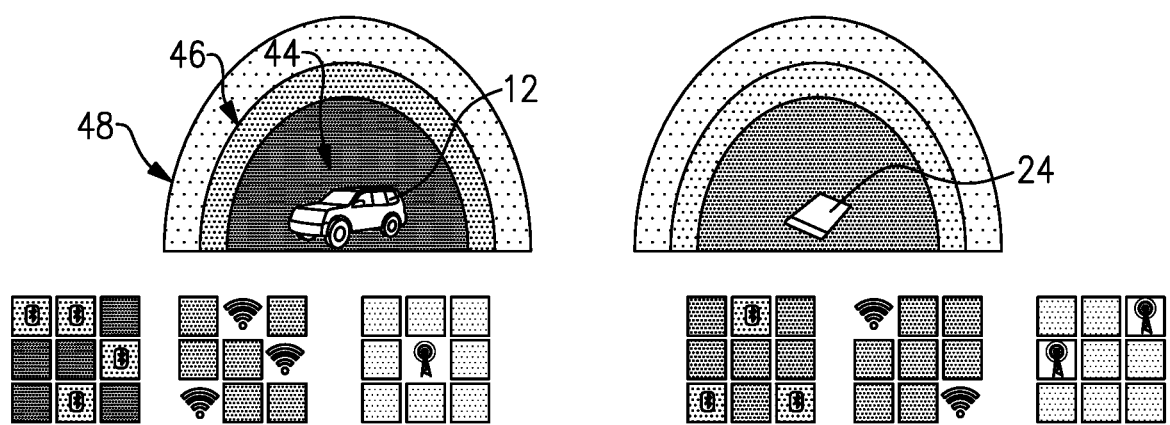
FIG. 8 schematically illustrates the vehicle and the identification device within different zones for three example interfaces

As illustrated in FIG. 8, the identification device 24 may be outside of zones 44, 46, 48, such that patterns 38A and 38B are mismatched, patterns 40A and 40B are mismatched, and patterns 42A and 42B are mismatched. That is, the vehicle 12 and the identification device 24 are in different BLE, Wi-Fi, and LTE environments. In this state, in some examples, access to the vehicle 12 may be denied. In some examples, with reference to FIG. 1, the ECU 16 may determine a mismatch between the patterns 38A and 38B, patterns 40A and 40B, and patterns 42A and 42B, and deny access to the vehicle 12. In some examples, one or more BLE, Wi-Fi, and LTE associated devices, such as BLE, Wi-Fi, and LTE transceivers in some examples, may be turned off on the vehicle 12 side because the identification device 24 is out of BLE, Wi-Fi, and LTE range. In some examples, the BLE, Wi-Fi, and LTE may remain off until the vehicle 12 receives a signal through the search and listen function that the identification device 24 has acquired the initial patterns from when it was in close proximity or has begun to acquire these initial patterns.

Figure 9:
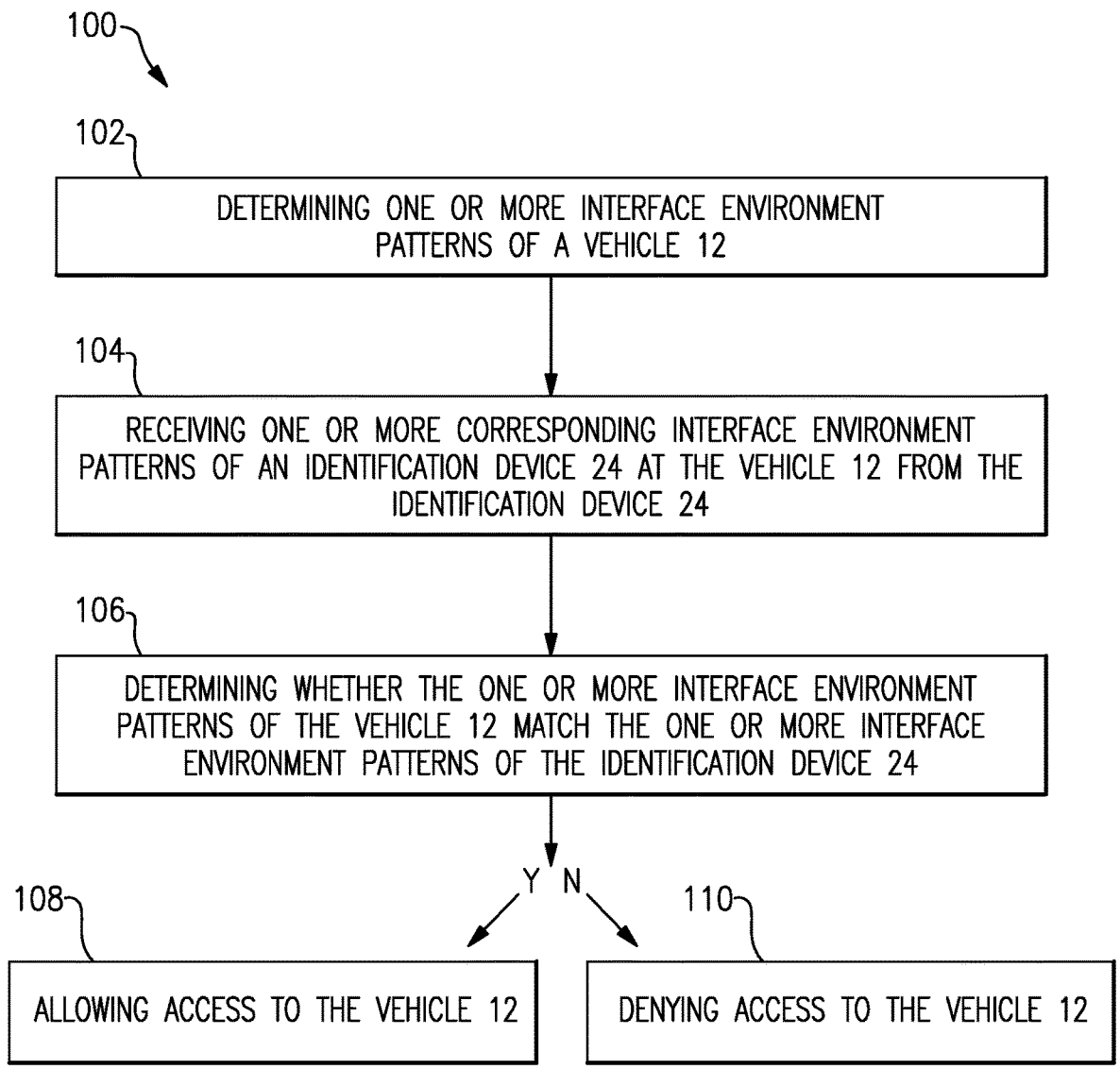
FIG. 9 illustrates a flow chart for an example method for access to a vehicle.

In some examples, in response to the patterns shown in FIG. 8, complete shutdown to near field interfaces access availability occurs with indirect communication required. In some examples, when all authorized identification devices 24 are in areas that are mismatched on all interfaces 26, the vehicle 12 can achieve maximum power saving by turning off all direct path communication (BLE, WiFi, etc) and wait for realignment in the identification device 24 LTE 28 environment before resuming the search function on the direct paths. As one example, when the vehicle 12 is parked at an airport, no authorized user will be near the vehicle 12 for days. FIG. 9 illustrates an example method 100 for access to a vehicle 12, that may be utilized with one or more of the examples illustrated in FIGS. 1-8. At 102, one or more interface environment patterns of a vehicle 12 are determined. At 104, one or more corresponding interface environment patterns of an identification device 24 are received at the vehicle 12 from the identification device 24. In some examples, the identification device 24 determines the corresponding interface environment patterns and communicates them to the vehicle 12. In some examples, the identification device environment patterns are received to the ECU system 16.

At 106, the method 100 includes determining whether the one or more interface environment patterns of the vehicle 12 match the one or more interface environment patterns of the identification device 24, which may be determined by the ECU system 16 in some examples. If the patterns match, at 108, access to the vehicle 12 is allowed. If the patterns do not match, at 110, access to the vehicle 12 is denied. The ECU system 16 may send control signals to perform steps 108 and/or 110 in some examples.

In some examples, the method 100 may further include selecting a sub-group of wireless interfaces from a larger group of wireless interfaces. In some examples, the method 100 may include authenticating the identification device 24.

In some examples, when the vehicle 12 is stopped in a parked location, in the ECU system 16, the access rights management ECU determines the wireless environment signature from various other ECUs which directly control the transceivers associated with the interfaces 26 common to the identification device 24. As the user parks the vehicle 12 and prepares to exit, the identification device 24 also collects information about these common wireless interfaces 26 from its perspective and shares this with the vehicle 12. The vehicle 12 is then prepared to only recognize near proximity requests from that specific device 24 when the reported environment signature with the request matches the initial exchange.

In instances where the wireless environment changes over time, the vehicle 12 will monitor the interfaces 26 at optimized event- and time-based check points to confirm the stability of the wireless environment. If the environment does change over time, then the vehicle 12 will predict the associated delta that the identification device 24 should report when it sends a near proximity request. For example, an LTE 28 environment pattern for a device 24 in the same location may be different in the night than it was during the day due to the shutting down of one or more nearby LTE towers. The system 10 may account for changes to the patterns throughout the day. When the original user returns, the vehicle 12 can make a characterized estimate of what that identification device 24 should determine as the pattern at its current location. Understanding the expected "delta" from the time of separation, the vehicle 12 can prevent replay attacks from an unauthorized device replaying an old pattern.

In instances where the vehicle 12 is moved by another authorized user to a different wireless environment, then the vehicle 12 can take the approach to get the original device 24 signature from the time it left the vehicle 12 initially as well as a delta to the current environment from the same device 24.

In some examples, such as in the case where this passive wireless environment signature feature is disabled or not available, then a multi-factor identification with the user of the device 24 and the vehicle 12 may be employed to confirm to the ECU system 16 that an authorized user is in control of the identification device 24.

Figure 10:
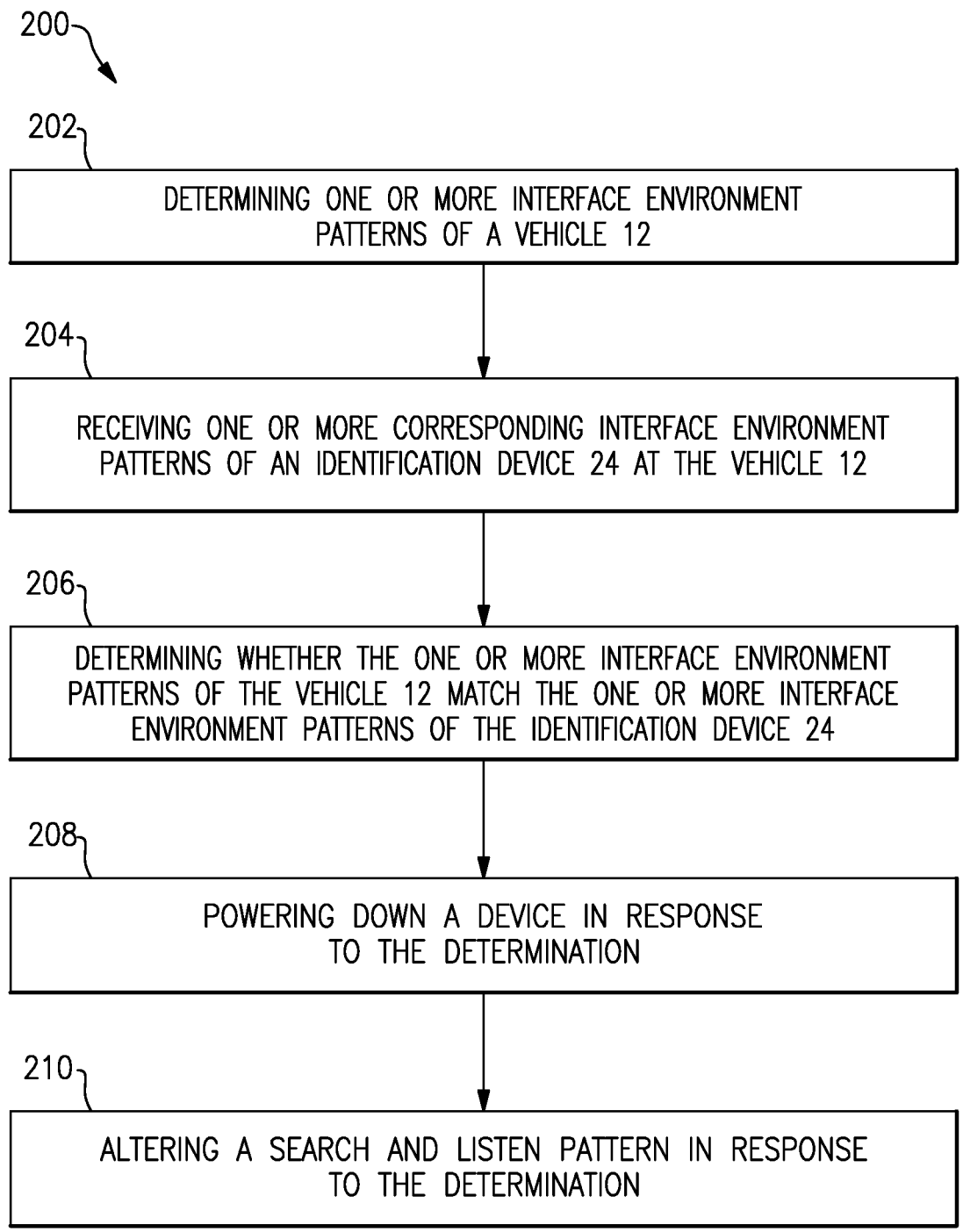
FIG. 10 illustrates a flow chart for an example method for conserving power in a vehicle.

FIG. 10 illustrates a method 200 of conserving power in a vehicle 12 that may be utilized with one or more of the examples illustrated in FIGS. 1-8, as well as the method 100 of FIG. 9. At 202, one or more interface environment patterns of a vehicle 12 are determined. At 204, one or more corresponding interface environment patterns of an identification device 24 are received at the vehicle 12, such as to the ECU 16 in some examples. In some examples, the identification device 24 determines the corresponding interface environment patterns and communicates them to the vehicle 12. At 206, the method includes determining whether the one or more interface environment patterns of the vehicle 12 match the one or more interface environment patterns of the identification device 24, which may be determined by the ECU 16 in some examples. At 208, the method 200 may include powering down a device in response to the determination. At 210, the method may include altering a search and listen pattern in response to the determination. In some examples, one or both of the steps 208 and 210 are performed in response to a mismatch of the patterns. The method may include powering up a device in response to a determination.

The steps of the methods 100 and 200 may be performed in the order shown in some examples, or in different orders in other examples.

The access system 10 and associated methods improves battery life and enhances security of the vehicle. Vehicles and devices can further enhance the proximity detection through their ability to recognize their environment to determine if search and listen functions of the access system should be available and authorize actions. Vehicles and devices share a set of communication interfaces that can be utilized to add diversity to the search and listen functionality to limit activity down to when the device and vehicle are within a defined proximity.

The system 10 and associated methods adapts the search and interface priority to the environment regarding available interfaces between the device and the vehicle and also the status of the device and the vehicle. This diversity in available interfaces creates opportunity to tune the search criteria to match the available range and proximity of the vehicle and the access device to the current environment. With this shared interface tuning between the device and vehicle, the security is improved by requiring a much more sophisticated attack vector matching the number and status of selected interfaces and sensors required to determine authorization state availability.

The system 10 could include any combination of wireless interface measurements or environment detection sensors available to the vehicle and the smart device.

Although the different examples are illustrated as having specific components, the examples of this disclosure are not limited to those particular combinations. It is possible to use some of the components or features from any of the examples in combination with features or components from any of the other examples.

A worker of ordinary skill in the art would understand that certain modifications could come within the scope of this disclosure. For these reasons, the following claims should be studied to determine the true scope and content of this disclosure.

What is claimed is:

1. A method for access to a vehicle, the method comprising:
    (a) determining first environment patterns for a plurality of interfaces relative to a vehicle;
    (b) determining whether the first environment patterns match second environment patterns for the plurality of interfaces relative to an identification device; and
    (c) allowing access to the vehicle if a match is determined in step (b);
    wherein the environment patterns are indicative of density maps of locations of at least one of transmitters, receivers and transceivers relative to at least one of the respective vehicle and the respective identification device.

2. The method as recited in claim 1, the method comprising:
    before step (b), (d) receiving the second environment patterns from the identification device to the vehicle.

3. The method as recited in claim 1, wherein step (c) includes unlocking a door of the vehicle.

4. The method as recited in claim 1, wherein the plurality of interfaces includes LTE.

5. The method as recited in claim 1, wherein the plurality of interfaces includes Wi-Fi.

6. The method as recited in claim 1, wherein the plurality of interfaces includes BLE.

7. The method as recited in claim 1, wherein an ECU system of the vehicle performs steps (a), (b), and (c).

8. The method as recited in claim 7, wherein the ECU system includes a plurality of electronic control units.

9. A vehicle access system, comprising:
    at least one lock; and
    an ECU system configured to determine a first group of environmental patterns for a plurality of interfaces for the vehicle, receive a second group of environmental patterns for the plurality of interfaces for an identification device, compare the first group to the second group, and send a control signal to the at least one lock based on the comparison;
    wherein the environment patterns are indicative of density maps of locations of at least one of transmitters, receivers and transceivers relative to at least one of the respective vehicle and the respective identification device.

10. The vehicle access system as recited in claim 9, wherein the control signal is a signal to disengage the at least one lock.

11. The vehicle access system as recited in claim 9, wherein the ECU system includes a plurality of electronic control units.

12. The vehicle access system as recited in claim 9, wherein the ECU system includes an access rights management electronic control unit.

13. The vehicle access system as recited in claim 9, wherein the ECU system is configured to power down a device associated with one or more of the plurality of interfaces based on the comparison.

14. The vehicle access system as recited in claim 9, wherein the ECU system is configured to alter a search and listen pattern based on the comparison.

15. The vehicle access system as recited in claim 9, wherein the ECU system is configured to communicate with the identification device.

16. A method of conserving power in a vehicle, the method comprising:
   (a) determining first environment patterns for a plurality of interfaces relative to a vehicle;
   (b) comparing the first environment patterns to second environment patterns for the plurality of interfaces relative to an identification device; and
   (c) powering down a device of the vehicle based on the comparing step;
   wherein the environment patterns are indicative of density maps of locations of at least one of transmitters, receivers and transceivers relative to at least one of the respective vehicle and the respective identification device.

17. The method as recited in claim 16, the method comprising: (d) altering a search and listen pattern based on the comparing step 17.

18. The method as recited in claim 16, wherein step (c) is performed in response to a mismatch between the first environment patterns and the second environment patterns.

19. The method as recited in claim 18, wherein the mismatch is between a BLE pattern of the first environment patterns and a BLE pattern of the second environment patterns, and the powered down device is a BLE transceiver.

20. The method as recited in claim 18, wherein the mismatch is between a Wi-Fi pattern of the first environment patterns and a Wi-Fi pattern of the second environment patterns, and the powered down device is a Wi-Fi transceiver.

* * * * *